United States Patent [19]

Acheson

[11] Patent Number: 5,558,268
[45] Date of Patent: Sep. 24, 1996

[54] TORCH ASSEMBLY FOR A CONICAL SURFACE

[75] Inventor: Rees Acheson, Alstead, N.H.

[73] Assignee: Bortech Corporation, Alstead, N.H.

[21] Appl. No.: 427,886

[22] Filed: Apr. 26, 1995

[51] Int. Cl.$^6$ .............................. B23K 9/12; B23K 37/02
[52] U.S. Cl. ........................... 228/29; 228/45; 219/76.14; 219/125.11
[58] Field of Search .................................. 228/45, 29, 25; 219/76.14, 125.11

[56] References Cited

U.S. PATENT DOCUMENTS

| | | |
|---|---|---|
| 3,010,010 | 11/1961 | Jackson et al. . |
| 3,133,184 | 5/1964 | Rienhoff et al. . |
| 3,185,814 | 5/1965 | Rössner et al. ...................... 219/76.14 |
| 3,254,192 | 5/1966 | Braucht . |
| 3,569,658 | 3/1971 | Moore . |
| 3,594,534 | 7/1971 | Benfield ............................ 219/125.11 |
| 3,627,973 | 12/1971 | Smith . |
| 3,795,785 | 3/1974 | Smith . |
| 4,371,107 | 2/1983 | Watanabe et al. ........................ 228/45 |
| 4,540,870 | 9/1985 | Kaufmann . |
| 4,687,899 | 8/1987 | Acheson . |
| 4,867,718 | 9/1989 | duPont . |
| 4,867,719 | 9/1989 | duPont . |
| 4,873,419 | 10/1989 | Acheson . |
| 4,892,990 | 1/1990 | Acheson . |
| 4,943,250 | 7/1990 | DuPont . |
| 4,952,769 | 8/1990 | Acheson . |
| 5,169,053 | 12/1992 | Rochat ..................................... 228/45 |
| 5,248,272 | 9/1993 | duPont . |
| 5,298,710 | 3/1994 | Acheson et al. . |
| 5,360,157 | 11/1994 | Gilbert et al. ............................ 228/45 |

*Primary Examiner*—P. Austin Bradley
*Assistant Examiner*—Jeffrey T. Knapp
*Attorney, Agent, or Firm*—Fish & Richardson P.C.

[57] ABSTRACT

A welding mechanism for build up of a conical surface includes a base assembly with a base gear fixedly mounted thereto, and a slide rail assembly rotatable about a base axis. The slide rail assembly includes a slide rail positionable parallel to the conical surface, a slide carriage moveable along the slide rail, carrying a welding torch, a rotatable lead screw in threaded engagement with the slide carriage, and a carriage gear rotatable with the lead screw and engaged with the base gear. Rotation of the slide rail assembly moves the torch on the slide carriage circumferentially along the conical surface, and, simultaneously, rotation of the slide carriage assembly, by inter-engagement of the carriage and base gears, causes the slide carriage to move along the slide rail carrying the torch radially along the conical surface, the torch moving in a spiral path, about the base axis, along the surface.

16 Claims, 10 Drawing Sheets

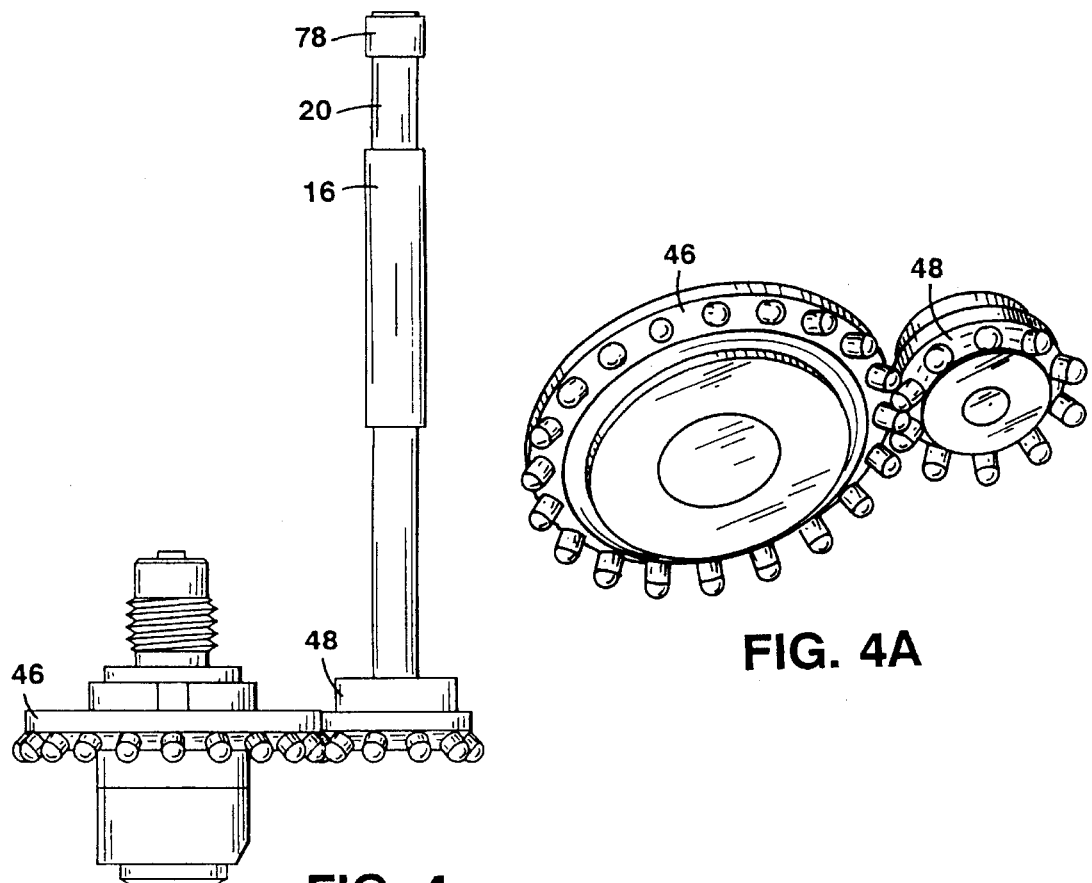
FIG. 4
FIG. 4A
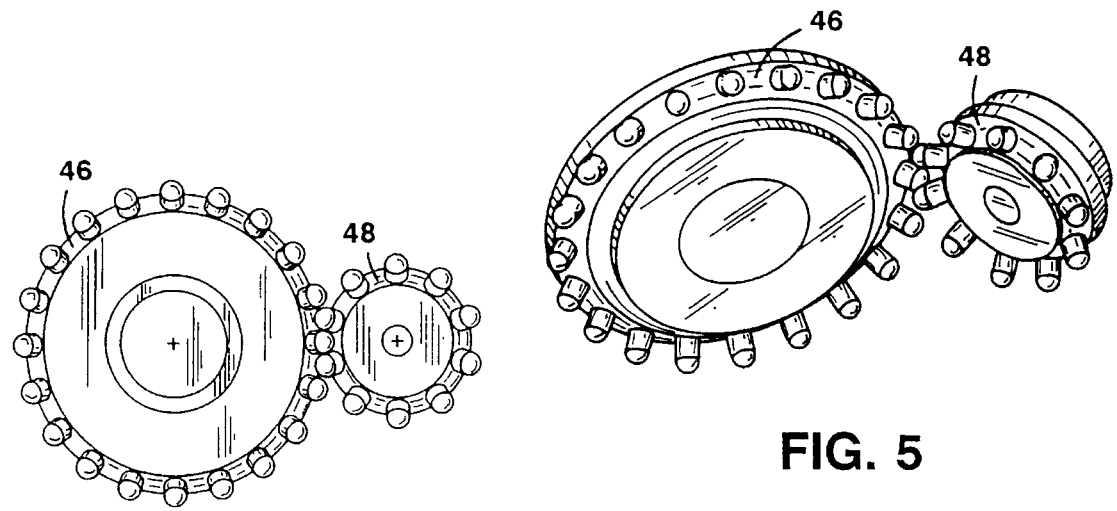
FIG. 4B
FIG. 5

5,558,268

TORCH ASSEMBLY FOR A CONICAL SURFACE

BACKGROUND OF THE INVENTION

This invention relates to a torch assembly for positioning a torch about a conical surface.

It has been known to provide an automatic apparatus for weld build-up a surface of revolution, e.g. within an axial bore, consisting of an elongated, rotatable assembly supporting an electrical welding torch at an end extending within the axial bore. It has also been known to provide torch and arm assemblies for adjusting the position of the torch nozzle relative to the surface upon which the weld build-up is to be applied, in order to accommodate a wide range of bore depths and diameters. Such devices are described, e.g., in prior patents Acheson U.S. Pat. No. 4,687,899; Acheson U.S. Pat. No. 4,873,419; Acheson U.S. Pat. No. 4,892,990; Acheson U.S. Pat. No. 4,952,769 and Acheson et al. U.S. Pat. No. 5,298,710, the entire disclosures of each of which are incorporated herein by reference. Devices having a similar purpose are described, e.g. in Fuwesi U.S. Pat. No. 4,527,039 and Fuwesi U.S. Pat. No. 4,550,235.

The prior patent Acheson et al. U.S. Pat. No. 5,298,710, mentioned above, describes an apparatus that can be mounted for weld build-up upon a flat surface of revolution.

SUMMARY OF THE INVENTION

According to one aspect of the invention, a mechanism for applying a weld bead for build up of a conical surface comprises a base assembly with base gear means fixedly mounted thereto, a slide rail assembly mounted for rotation relative to the base assembly, about a base axis, the slide rail assembly comprising: at least one slide rail adapted to be positioned generally parallel to the conical surface, a slide carriage mounted for movement along the at least one slide rail, carrying a welding torch, a lead screw mounted for rotation relative to, and disposed in threaded engagement with, the slide carriage, and slide carriage gear means mounted for rotation with the lead screw and in engagement with the base gear means, and means for rotating the slide rail assembly relative to the base axis, whereby, rotation of the slide rail assembly relative to the base axis moves the torch carried by the slide carriage along the conical surface with a circumferential component of motion relative to the base axis, and, simultaneously, rotation of the slide carriage assembly, by inter-engagement of the slide carriage gear means with the base gear means, causes the slide carriage to move along the at least one slide rail with the torch carried by the slide carriage moving along the conical surface with a radial component of motion relative to the base axis, the torch being moved in a spiral path, about the base axis, along the conical surface.

Preferred embodiments of this aspect of the invention may include one or more of the following additional features. The slide rail assembly is mounted for pivoting movement relative to the base assembly, the at least one slide rail being positionable generally parallel to a range of conical surface angles. Preferably, the range of conical surface angles comprises angles above and below perpendicular to the base axis; more preferably, the angles below perpendicular to the base axis include angles up to 30° below perpendicular to the base axis and the angles above perpendicular to the base axis include angles up to parallel to the base axis. The base gear means comprises a base pinion gear and the slide carriage gear means comprises a slide carriage pinion gear. The slide carriage assembly comprises at least two, parallel slide rails.

According to another aspect of the invention, a mechanism for applying a weld bead for build up of a conical surface comprises a base assembly with base gear means fixedly mounted thereto, a slide rail assembly mounted for rotation relative to the base assembly, about a base axis, the slide rail assembly comprising: at least one slide rail adapted to be positioned generally parallel to the conical surface, a slide carriage mounted for movement along the at least one slide rail, carrying a welding torch, slide carriage gear means disposed in engagement with the base gear means, and a lead screw mounted for rotation relative to, and disposed in threaded engagement with, the slide carriage, and means for rotating the slide carriage gear means, and means for rotating the lead screw, whereby, rotation of the slide rail assembly relative to the base axis moves the torch carried by the slide carriage along the conical surface with a circumferential component of motion, relative to the base axis, and, with each revolution, rotation of the lead screw causes the slide carriage to move along the at least one slide rail, with the torch carried by the slide carriage moving along the conical surface with a radial component of motion, relative to the base axis, the torch being moved in a circumferential stepped path about the base axis, along the conical surface.

Preferred embodiments of this aspect of the invention may include one or more of he following additional features. The slide rail assembly is mounted for pivoting movement relative to the base assembly, the at least one slide rail being positionable generally parallel to a range of conical surface angles. Preferably, the range of conical surface angles comprises angles above and below perpendicular to the base axis. More preferably, the angles below perpendicular to the base axis include angles up to 30° below perpendicular to the base axis, and the angles above perpendicular to the base axis include angles up to parallel to the base axis. The base gear means comprises a base pinion gear and the slide carriage gear means comprises a slide carriage pinion gear. The slide carriage assembly comprises at least two, parallel slide rails. The means for rotating the lead screw comprises a motor, or a cam lobe and ratcheting mechanism.

These and other features and advantages of the invention will be apparent from the following description of a presently preferred embodiment, and from the claims.

BRIEF DESCRIPTION OF THE DRAWINGS

FIG. 4 is a side view of the base and slide assembly in engagement, with the slide assembly axis parallel to the base axis; FIG. 4A is a perspective view thereof; FIG. 4B is a bottom view thereof.

FIG. 5 is a perspective view of the base gear and slide assembly gear in engagement, with the slide assembly axis.

DESCRIPTION OF PRESENTLY PREFERRED EMBODIMENTS

Figure 1:
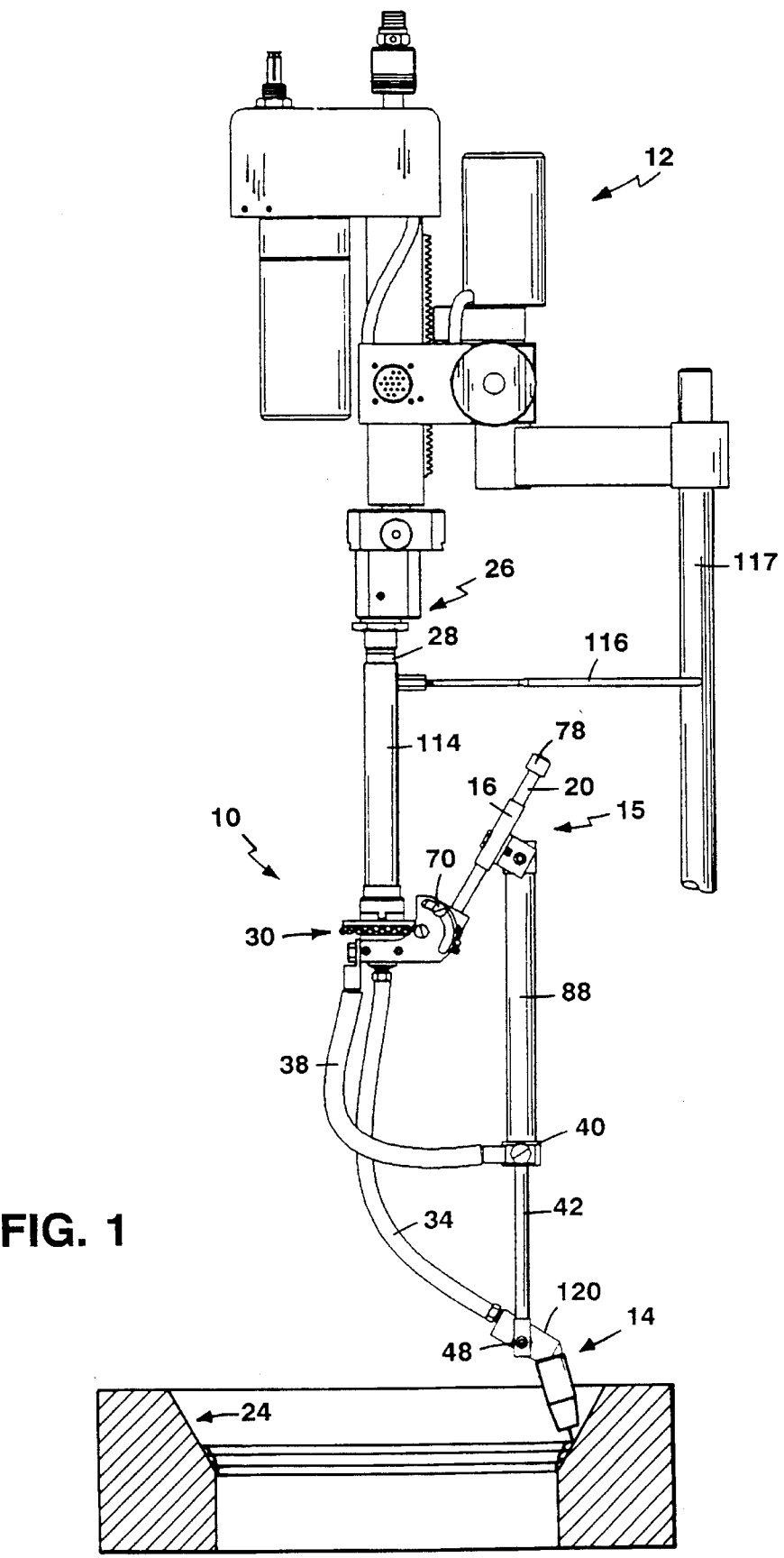
FIG. 1 is a somewhat diagrammatic side view of a conical bore torch assembly, mounted, by way of example only, to a BORTECH 306-P welder, as described in my earlier U.S. patents, mentioned above.
Figure 1A:
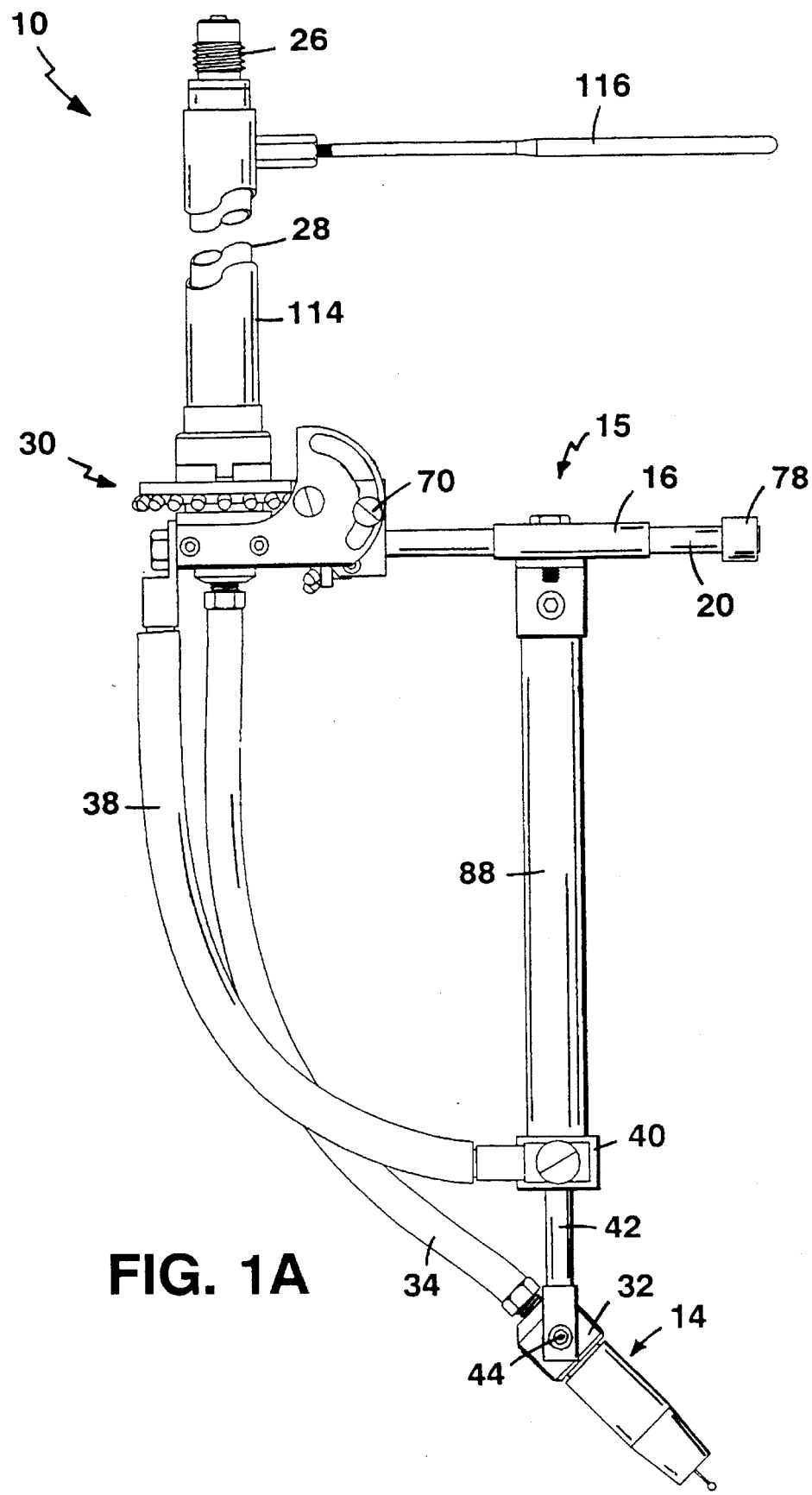
FIG. 1A is a similar, enlarged side view of the conical bore torch assembly of FIG. 1, using an alternative torch head.
Figure 1B:
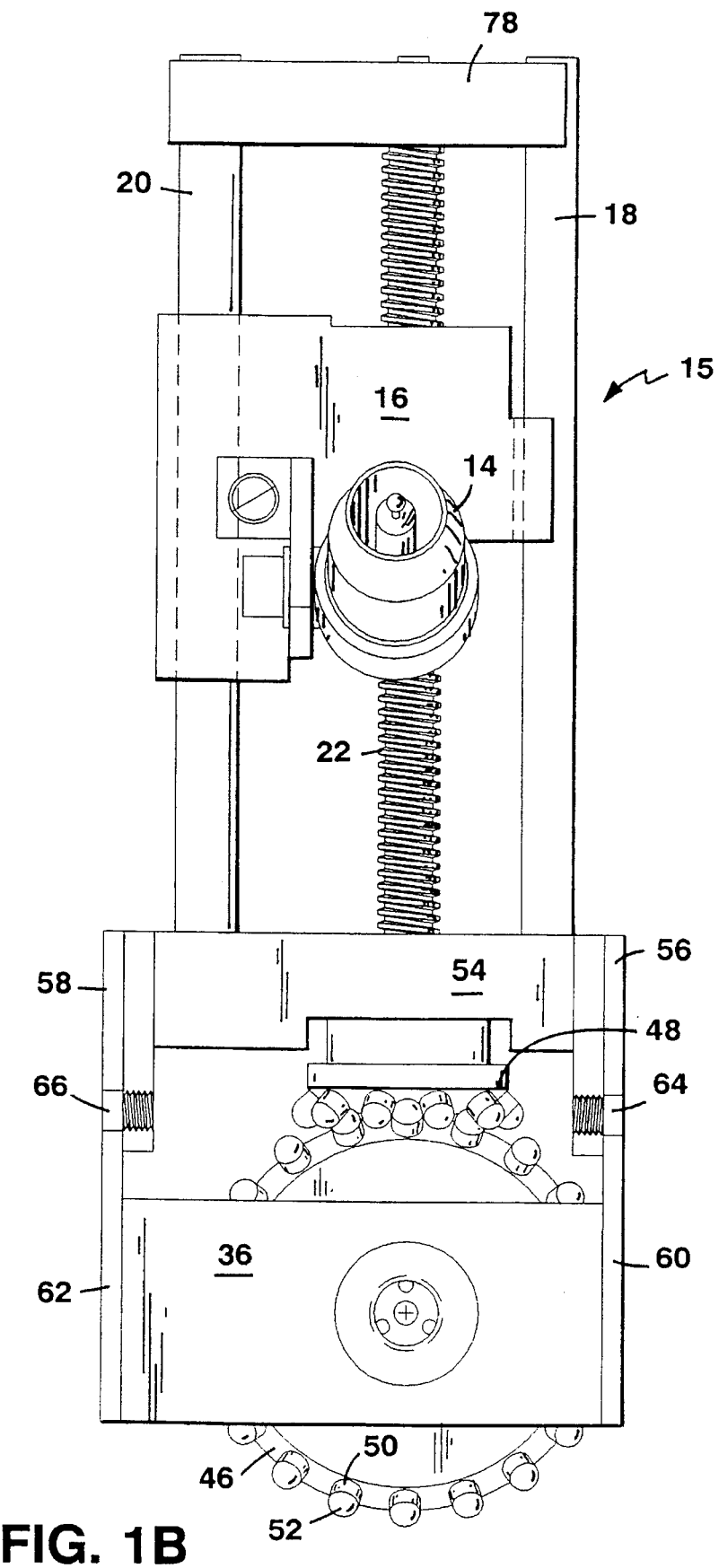
FIG. 1B is a bottom view of the conical bore torch assembly of FIG. 1.
Figure 2:
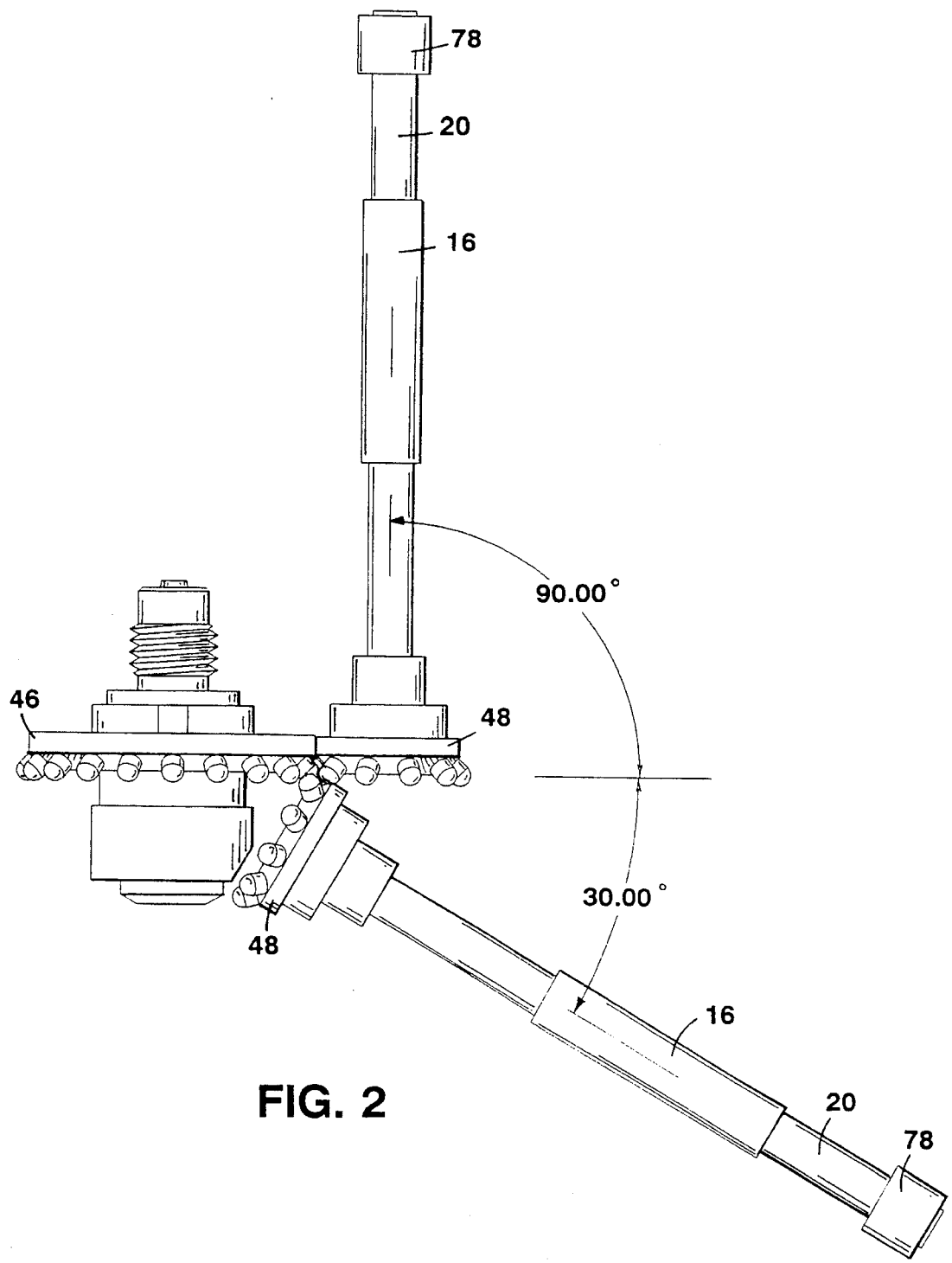
FIG. 2 is a side view of the base and slide assembly in engagement, with the slide assembly at upper and lower ranges of angular adjustment.
Figure 3B:
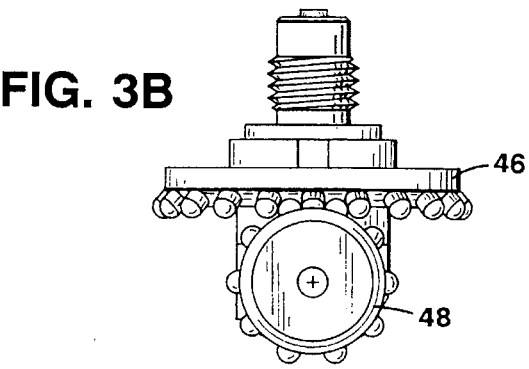
FIG. 3B is an end view thereof.
Figure 3:
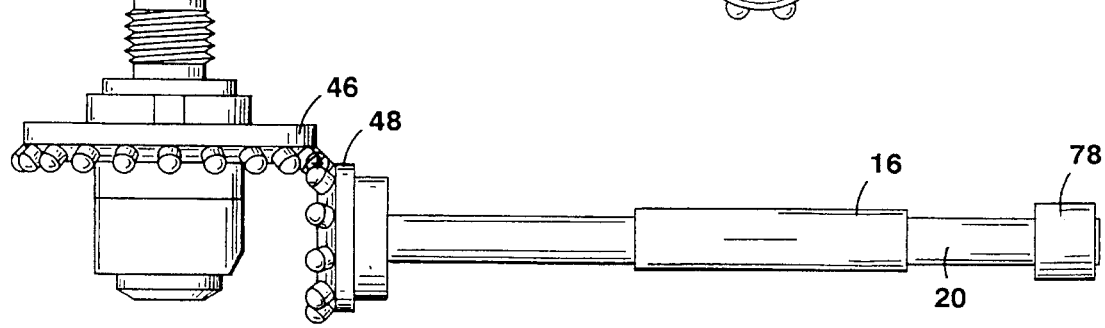
FIG. 3 is a side view of the base and slide assembly in engagement, with the slide assembly axis perpendicular to the base axis.
Figure 3C:
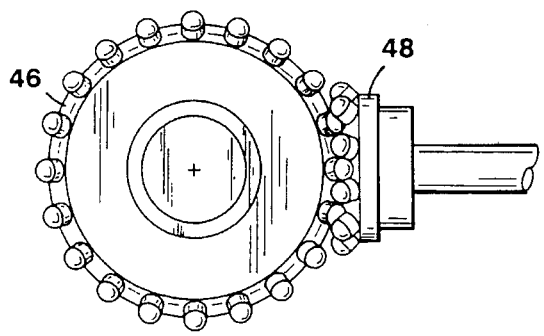
FIG. 3C is a bottom view thereof.
Figure 3A:
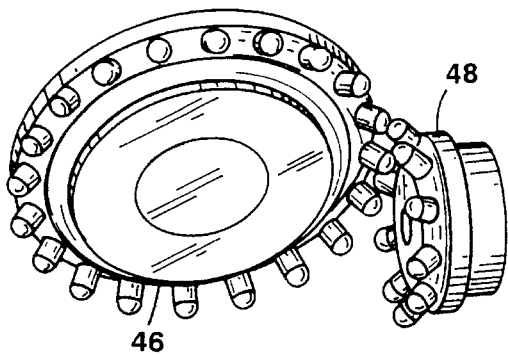
FIG. 3A is a perspective view thereof.

Referring to FIGS. 1–1B, a conical bore torch assembly 10 of the invention, designed to overlay interior and exterior conical surfaces by welding, is shown mounted to a BORTECH 306-P BoreWelder 12 (Bortech Corporation, of Alstead, N.H.). A torch 14 is connected to a slide assembly 15 that includes a slide block 16 which travels along guide rails 18, 20, having square and circular transverse cross-sections, respectively, by way of a lead screw 22. If the guide rails are adjusted at an angle that is parallel to the conical surface the torch can follow a conical surface 24. If the torch is rotated and, at the same time, the lead screw is turned, the torch can follow a path that covers the entire conical surface. The guide rails are adjustable throughout a 120° arc: from parallel to the base axis (e.g., for welding a cylindrical bore) to perpendicular to the base axis (e.g., for welding a flange), and further to 30° below perpendicular to the base axis.

The entire device connects to the BoreWelder though a threaded torch connector 26 (as described in our earlier patent). To this connector, one or more extensions 28 are added to adjust the reach of the torch. Inert gas enters through holes in the connector, travels though the hollow extension(s), into a base 30, and through a conduit hose 34 to a torch head 32. Welding wire enters through the center of the connector and is guided through the various parts of the torch assembly by one or more liners (e.g., one liner in torch assembly 10 and one for each extension 28). The torch assembly liner begins at and is secured in base 30 and is guided within hose 34 to torch head 32. Electric current enters through seating surfaces of threaded connection 26 and travels through base 30, through a hub block 36, through a conductor cable 38, to a bushing 40, through a rod 42, and into torch head 32, which is secured to rod 42 by a screw 44.

We note that conical bore torch assembly 10 does not specifically require a BORTECH BoreWelder for successful operation. But in preferred embodiments, the torch assembly connects to an apparatus that includes the following features: a rotating power connector for supplying electric welding current; a support that includes a rotatable spindle; a rotator for continuously rotating the spindle (preferably with adjustable speed capabilities); a rotatable shielding gas coupling (unless no gas shield is used—e.g., when flux cored wire is used); and an electrical isolator.

As mentioned above, the slide rails rotate about the base axis, while maintaining an alignment parallel with the conical surface to be welded. In a presently preferred embodiment, this motion is achieved by using spherical toothed gears 46, 48, e.g. as described in DuPont U.S. Pat. Nos. 5,248,272; 4,943,250; 4,867,719; and 4,867,718, the complete disclosures of which are incorporated herein by reference. These gears remain in mesh at any angle that the slide rails are adjusted to. As shown in FIGS. 2, 3–3C, 4–4B, and 5, base gear 46 and slide assembly gear 48 have teeth 50 made from round pins with hemispherical ends 52. The teeth are mounted so that the center of each of the hemispherical ends is on the pitch line of the gear. When the gears are in mesh there is essentially point contact of the spherical ends. The gears are pivotable as long as the pivot line is perpendicular to each of the gear axes and goes through the common pitch point between the gears.

Figure 6:
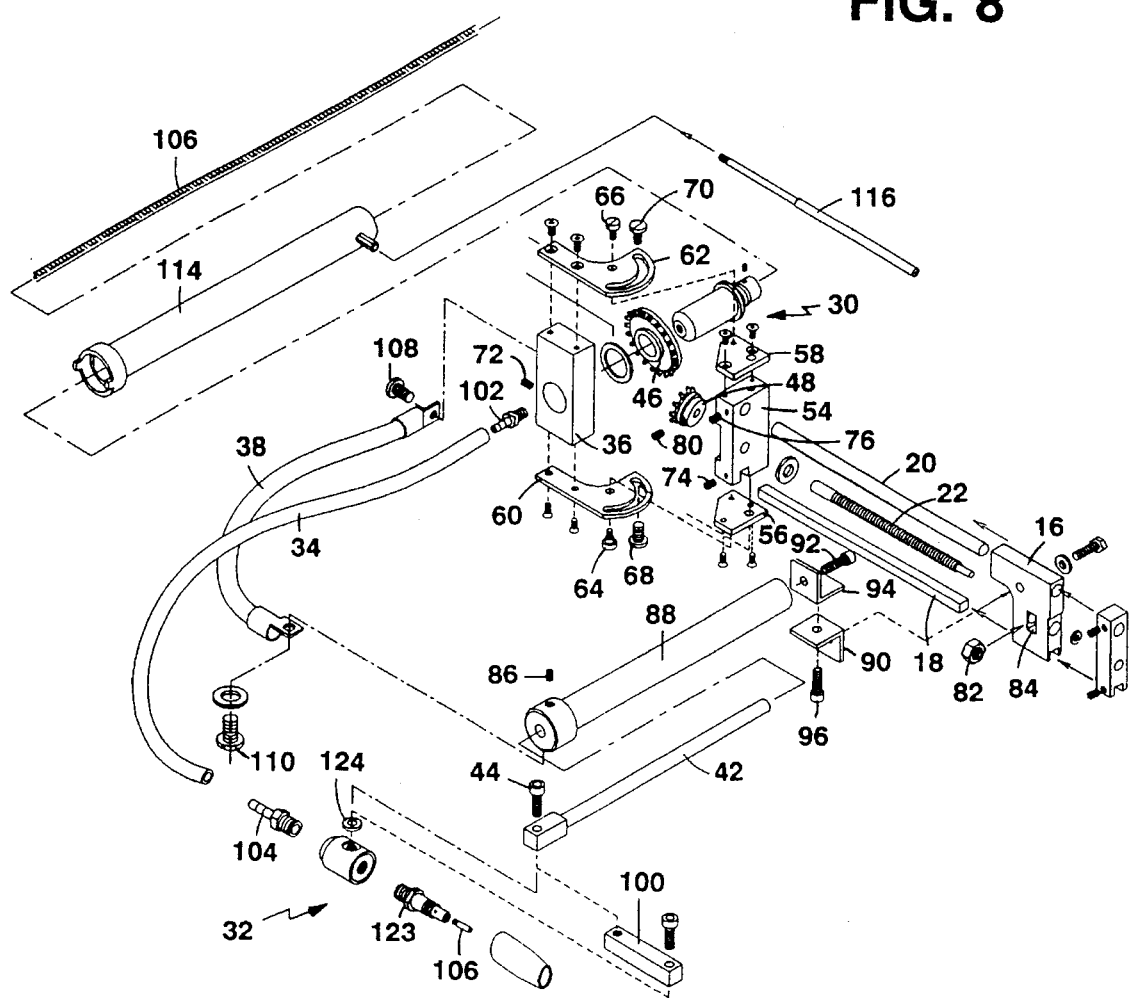
FIG. 6 is a perspective, exploded view of the conical bore torch assembly of FIG. 1A.

Referring to FIG. 6, base gear 46 and slide assembly gear 48 are held in a meshing position throughout their range of swing by a pinion block 54 and by hub block 36, which are secured to pinion block plates 56, 58 and to hub block side plates 60, 62, respectively. Pivot screws 64, 66 (shoulder screws) pass through hub block side plates 60, 62 and thread into pinion block side plates 56, 58. The two pivot screws are placed in line with each other. The pivot line is perpendicular to the axis of both swing-gears 46, 48 and passes through the point where the pitch circles of both gears meet. Two locking screws 68, 70 hold the gears and their related parts at a desired angle (relative to the vertex at the pivot screws) by clamping hub block side plates 60, 62 to pinion block side plates 56, 58.

Base 30 is secured into hub block 36 by a set screw 72. Base 30 is the connection point of the torch assembly to a rotator in the in the BoreWelder and is also the axle for base gear 46, which is rotatably mounted thereto. Inert gas, welding wire, and electric power enter base 30 in the same fashion as any BORTECH torch or torch extension described in my earlier patents.

Guide rails 18, 20 are secured into pinion block 54 by two set screws 74, 76. Travel block 16 is slipped over these guide rails to form a sliding carriage. An end block 78 supports the free ends of the guide rails 18, 20 and helps keep them in alignment. Lead screw 22 passes through pinion block 54 and becomes the axle for slide assembly gear 48, which is secured to the lead screw by set screw 80. A nut 82 is slipped into a slot 84 in travel block 16 and the lead screw passes through the travel block, threads into nut 82, and continues onto be supported by end block 78. The hex shaped nut 82 is restrained from rotating by the sides of slot 84 in the traveling block 16. Rotation of base gear 46 causes slide assembly gear 48 to rotate, which rotates lead screw 22 and causing travel block 16 to slide on guide rails 18, 20.

Torch head 32 is held in an adjustable position by screw 44, a rod 42, a set screw 86, a rod tube 88, an angle bracket 90, a screw 92, a second angle bracket 94, a screw 96, and a screw 98. This assembly secures torch head 32 to travel block 16, and any movement of the travel block is also imparted to the torch head as well.

An extender 100 is optionally provided to extend the reach (diameter range) of the torch. Hose fitting 102 screws into base 30 and permits connection of conduit hose 34. Similarly, a second hose fitting 104 screws into torch head 32, permitting connection of other end of conduit hose 34 to the torch head. The conduit hose carries the inert gas from base 30 to the torch head, it also guides a liner 106 from the hub to the torch head. The liner directs the welding wire to the torch head and contact tip 106.

Cable 38 is secured to hub block 35 by a screw 108 and to rod tube 88 by a screw 110. Electric current can travel from base 30, into hub block 36, through cable 38, into rod tube 88, through rod 42, and into torch head 32. It should be noted however that cable 38 is not necessary. In an alternative embodiment, electric current travels though guide rails 18, 20, into traveling block 16, and down rod tube 88 to torch head 32. The use of cable 38 is advantageous when there is excessive heating of the guide rods (larger guide rods would solve the problem but would also add unwanted weight).

In use, a torch extension 28 of suitable length (FIG. 1) is screwed to the male thread of base 30. A tommy tube 114 is slipped over torch extension 28 and the two lugs on the end of the tommy tube are engaged into the mating slots of base gear 46 tommy rod 116 is also screwed into the threaded fitting of tommy tube 114. If the torch extension is rotated and the tommy tube 114 is prevented from rotating (e.g., by restricting the circular travel of tommy rod 116), the entire assembly, with the exception of base gear 46, is set into rotation with torch extension 28 (FIG. 1). With the entire assembly rotating around the stationary base gear, slide assembly gear 48 is consequently orbiting in mesh around base gear 46, causing rotation of slide assembly gear 48 and lead screw 22, thereby causing the travel block 16 to slide along guide rails 18, 20 at a rate that is proportional to the rotational speed of the lead screw. Thus, if base gear 46 (which is larger than slide assembly gear 46, in a presently preferred embodiment) is prevented from rotating, the lead screw will be turned automatically by way of the gear train, thus moving slide carriage 16 and torch 14. To prevent the gear from rotating, the tommy rod 16 is rested against a stationary object (e.g., the BoreWelder's mounting rod 117). In this way, tommy tube 114 holds the swing-gear 46 from rotating while torch extension 28, within tommy tube 114, causes the rest of the seat torch to rotate. The smaller slide assembly gear 48 then "walks" in mesh around the stationary larger swing-gear and, as a result, lead screw 22 rotates.

During buildup of external conical shapes, in one method, the slide rail assembly is set below perpendicular to the base axis, parallel with the conical surface; but this limits operation to cones of 120° or greater. To increase the range of operation, in another method, the slide rail assembly is set parallel to the opposite side of the cone and the torch head is positioned over-center, adjacent this opposite surface. In this manner, cones with angles up to 360° (flat) may be built up externally. In some cases, a dog leg is attached to the torch head mount (in place of extender 100), to allow the torch head to reach around the point of the cone.

Operation:

The first step involved in setting up conical bore torch assembly 10 is to "level" the adjustable base—that is, make the mounting rod 117 of the BoreWelder parallel to the axis of the bore. The simplest method is to mount a torch in the BoreWelder and adjust is to that it is just clear of a "face" surface on the part, rotate the BoreWelder spindle, note the distance of the torch nozzle to the face, and finally adjust the leveling screws until the clearance is the same all the way around. (It should be remembered, when mounting the adjustable base, to allow for the radial mount extenders that may be needed). The desired torch head style is selected, e.g., either torch head 32 (FIG. 1A) or 120 (FIG. 1); the 45° style typically is preferred. Next, the torch assembly is mounted to the BoreWelder. Note that one or more extensions 213 may be attached to the torch assembly so that tommy tube 114 can be slipped over while still reaching the BoreWelder. In a preferred configuration, a 3" extension and a 6" extension together reach just past the tommy tube. Once the torch assembly is mounted, guide rails 18, 20 should be adjusted so that they are parallel with the conical surface of the bore. This is done by loosening the two locking screws 68, 70 (one on each side) and pivoting the slide rail assembly around pivot screws 64, 66. Once set, locking screws 68, 70 are re-tightened. A clamp screw 118 (FIG. 1) is loosened and the telescoping reach tube 88 is adjusted to bring the torch near to the correct position; the clamp screw is then re-tightened. Clamp screw 44 is loosened and the desired torch angle is set. Good results have been observed when the torch head 32 is set to a 45° angle to the axis of the conical surface. Torch head rod 42 should be telescoped into the reach tube 88 so that the wire conduit 38 will have a gentle curve throughout the travel required of slide block 16. It may be advantageous to place a small "S" curve in the conduit to allow for torch movement. The BoreWelder should then be centered on a cylindrical bore surface of the part to be welded. Centering becomes difficult on the conical surface itself due to the fact that the conical surface shows up a combination of axial and radial inaccuracies. The torch assembly should be free to rotate without running into any obstructions.

Torch head 32 is then positioned at the beginning of the buildup job by rotating tommy tube 114 by hand. Once at the correct position, the tommy rod 28 is installed into the threaded hole in the tommy tube. The tommy rod should rest against a stationary object (e.g., the BoreWelder's mounting rod 117; FIG. 1) while the torch rotates. In order to obtain an increased overlap during the first to second revolution, the tommy rod is placed away from the stationary object by about ¼ turn. If this is done, feeding of torch assembly 10 will be delayed by ¼ revolution the first time around and therefore the first bead overlap will be greater by ¼ the feed rate. With a fixed feed rate, if the rotation is speeded up then the bead will thin slightly unless the wire speed is also increased. This thinning will become increasingly apparent during the next several revolutions as the bead adjusts to the new setting. Conversely, if the rotation were slowed, then there would be the opposite effect. Similarly, wire speed adjustments alter the bead shape as well.

Figure 7:
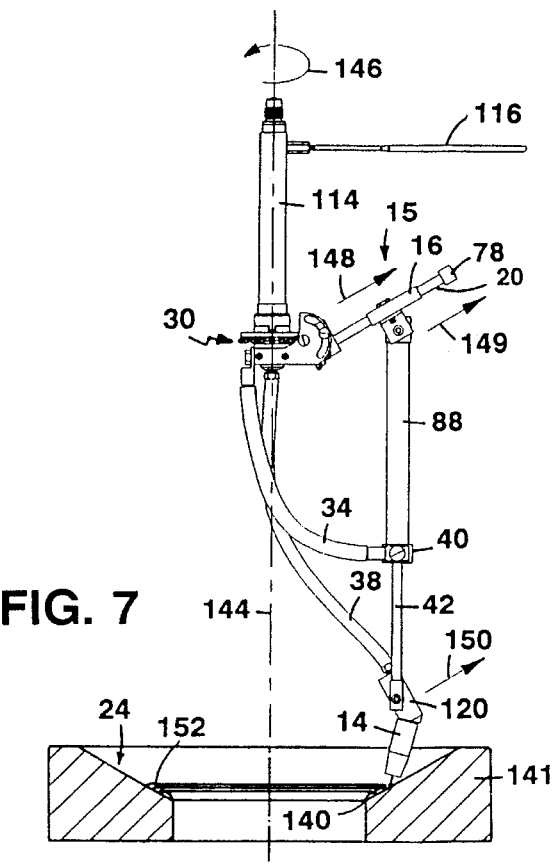
FIG. 7 is a somewhat diagrammatic side view of a conical bore torch assembly, mounted for counter-clockwise rotation with the torch beginning at a small diameter and moving outwardly.
Figure 7A:
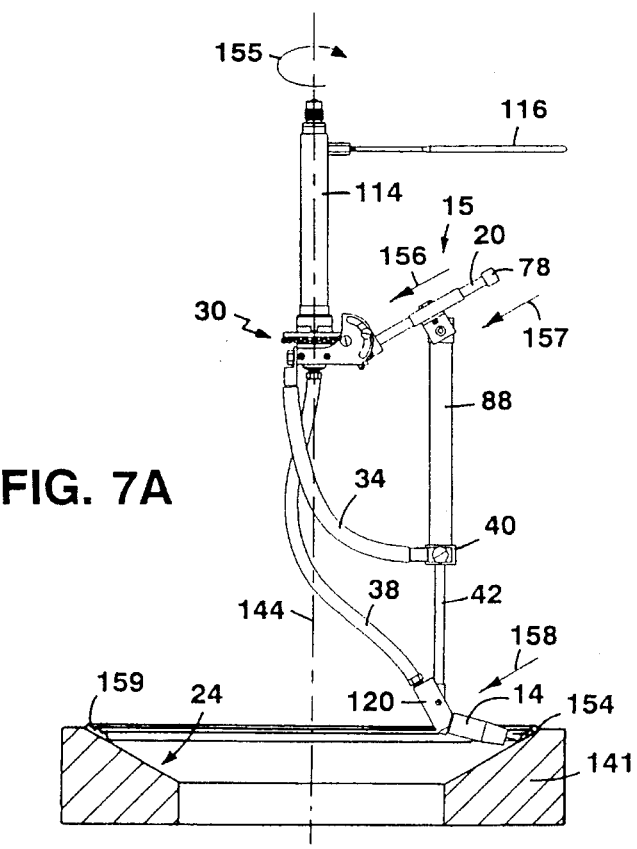
FIG. 7A is a similar view of a conical bore torch assembly, mounted for clockwise rotation with the torch beginning at a large diameter and moving inwardly.

Referring to FIG. 7, a conical bore surface 24 is built up by beginning the weld at a location 140 corresponding to the smallest diameter of the conical surface of a workpiece (part) 141. As slide assembly 15 rotates counter-clockwise about axis 144 of the conical bore (as indicated by arrow 146), the slide assembly moves torch 14 outward (as indicated by arrows 148, 149, 150). Because the slide assembly is parallel with conical surface 24, the torch follows surface 24, depositing a spiral weld bead 152 over the entire conical surface. Alternatively, as shown in FIG. 7A, conical bore surface 24 is built up by beginning the weld at a location 154 corresponding the largest diameter of the conical surface. As slide assembly 15 rotates clockwise about axis 144 of the conical bore (as indicated by arrow 155), the slide assembly moves torch 14 inward (as indicated by arrows 156, 157, 158), thereby depositing a spiral weld bead 159 over the entire conical surface.

Figure 8:
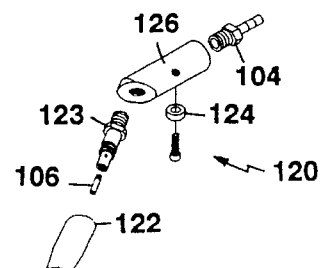
FIG. 8 is a perspective, exploded view of an alternative bore torch head.

Other embodiments are within the scope of the claims. For example, referring to FIG. 8, an alternative torch head 120 (also shown in FIG. 1) includes a nozzle 122, a diffuser, a spacer 124, and a nozzle holder 126. Torch head 120 holds the torch at an angle of 45° relative to the torch head axis, which may be preferred for welding some conical bores.

Figure 9:
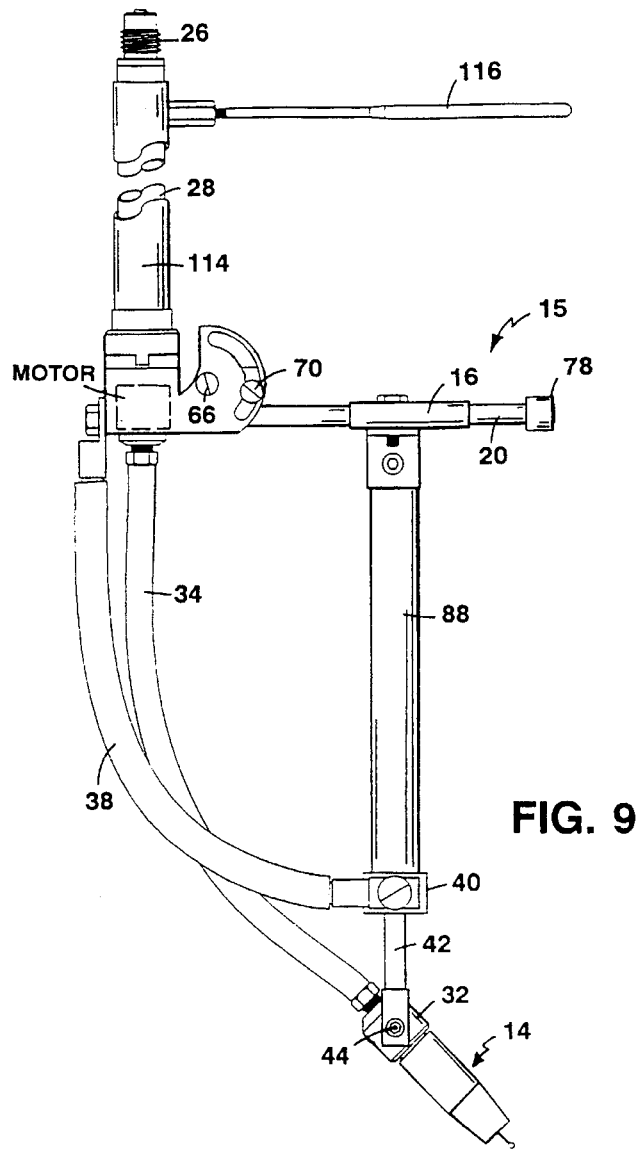
FIGS. 9 and 9A are diagrammatic side and bottom view of an alternative conical bore torch assembly.
Figure 9A:
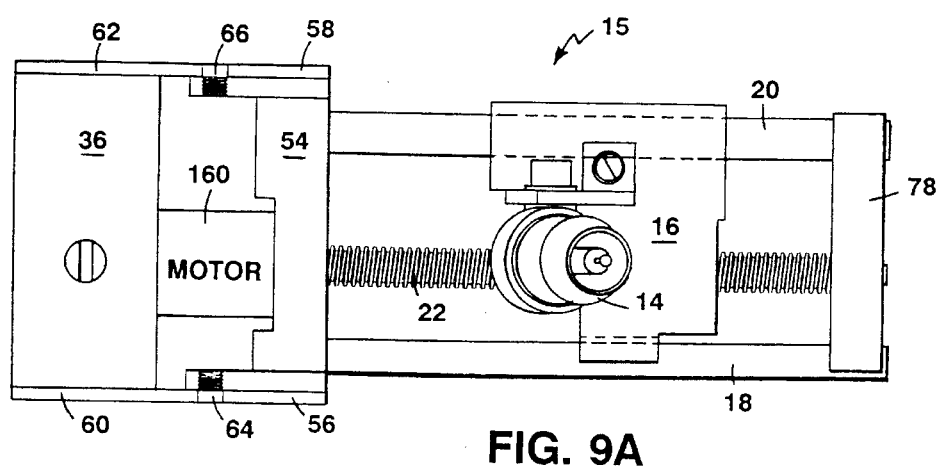
Figure 10:
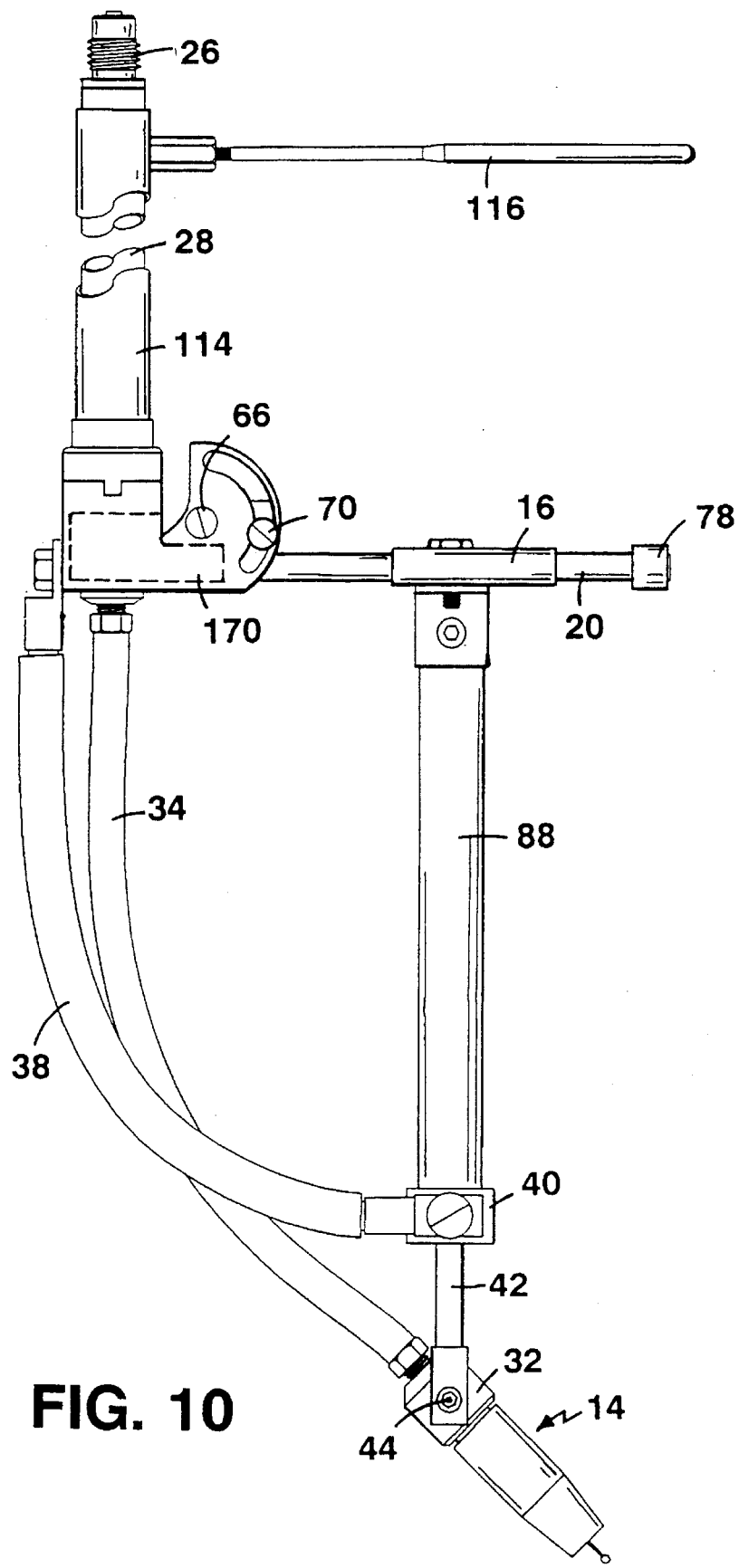
FIG. 10 is a diagrammatic side view of an alternative conical bore torch assembly.

Referring now to FIGS. 9 and 9A, in an alternative embodiment, a motor 160 is mounted to slide torch assembly 15 for rotation of lead screw 22. The motor is powered through the slip rings on the base assembly either continuously, to form a spiral pattern upon the conical surface, or intermittently, to form a circumferential, stepped pattern upon the conical surface, with the torch advanced radially at the end of each circumferential pass. In other words, rotation of the slide rail assembly relative to the base axis moves the torch carried by the slide carriage along the conical surface with a circumferential component of motion, relative to the base axis, and, with each revolution, rotation of the lead screw causes the slide carriage to move along the slide rails, with the torch carried by the slide carriage moving along the conical surface with a radial component of motion, relative to the base axis, moving the torch in a circumferential stepped path about the base axis, along the conical surface. Alternatively, intermittent lead screw rotation may be obtained mechanically by way of a cam lobe operating a ratcheting mechanism 170 with each circumferential pass, as shown in FIG. 10.

The traveling block may be internally threaded or tapped and the lead screw threaded directly into the traveling block, thus eliminating the nut.

Also, the MIG welding process could be replaced with TIG welding (Tungsten Inert Gas), with the electric arc struck between the work piece and a tungsten electrode. Filler wire would be fed through the system as usual. Alternatively, a plasma cutting torch could be mounted in place of the torch head for cutting or gouging, i.e. metal removal instead of buildup, with the same requirements of electric current, inert gas and rotary motion.

Still other embodiments are within the scope of the claims.

What is claimed is:

1. A mechanism for applying a weld bead for build up of a conical surface, said mechanism comprising:
    a base assembly with base gear means fixedly mounted thereto,
    a slide rail assembly mounted for rotation relative to said base assembly, about a base axis, said slide rail assembly comprising:
        at least one slide rail adapted to be positioned generally parallel to the conical surface,
        a slide carriage mounted for movement along said at least one slide rail, carrying a welding torch,
        a lead screw mounted for rotation relative to, and disposed in threaded engagement with, said slide carriage, and
        slide carriage gear means mounted for rotation with said lead screw and in engagement with said base gear means, and
    means for rotating said slide rail assembly relative to said base axis,
    whereby, rotation of said slide rail assembly relative to said base axis moves the torch carried by said slide carriage along the conical surface with a circumferential component of motion relative to the base axis, and, simultaneously, rotation of said slide carriage assembly, by inter-engagement of said slide carriage gear means with said base gear means, causes said slide carriage to move along said at least one slide rail with the torch carried by said slide carriage moving along the conical surface with a radial component of motion relative to the base axis, the torch being moved in a spiral path, about said base axis, along the conical surface.

2. The mechanism of claim 1, wherein said slide carriage assembly comprises at least two, parallel slide rails.

3. The mechanism of claim 1, wherein said slide rail assembly is mounted for pivoting movement relative to said base assembly, said at least one slide rail being positionable generally parallel to a range of conical surface angles.

4. The mechanism of claim 3, wherein said base gear means comprises a base pinion gear and said slide carriage gear means comprises a slide carriage pinion gear.

5. The mechanism of claim 3, wherein said range of conical surface angles comprises angles above and below perpendicular to said base axis.

6. The mechanism of claim 5, wherein said angles below perpendicular to said base axis include angles up to 30° below perpendicular to said base axis.

7. The mechanism of claim 5, wherein said angles above perpendicular to said base axis include angles up to parallel to said base axis.

8. A mechanism for applying a weld bead for build up of a conical surface, said mechanism comprising:
    a base assembly with base gear means fixedly mounted thereto,
    a slide rail assembly mounted for rotation relative to said base assembly, about a base axis, said slide rail assembly comprising:
        at least one slide rail adapted to be positioned generally parallel to the conical surface,
        a slide carriage mounted for movement along said at least one slide rail, carrying a welding torch,
        slide carriage gear means disposed in engagement with said base gear means, and
        a lead screw mounted for rotation relative to, and disposed in threaded engagement with, said slide carriage, and
    means for rotating said slide carriage gear means, and
    means for rotating said lead screw,
    whereby, rotation of said slide rail assembly relative to said base axis moves the torch carried by said slide carriage along the conical surface with a circumferential component of motion, relative to said base axis, and, with each revolution, rotation of said lead screw causes said slide carriage to move along said at least one slide rail, with the torch carried by said slide carriage moving along the conical surface with a radial component of motion, relative to said base axis, the torch being moved in a circumferential, stepped path about said base axis, along the conical surface.

9. The mechanism of claim 8, wherein said slide carriage assembly comprises at least two, parallel slide rails.

10. The mechanism of claim 8, wherein said means for rotating said lead screw comprises a motor.

11. The mechanism of claim 8, wherein said means for rotating said lead screw comprises a cam lobe and ratcheting mechanism.

12. The mechanism of claim 8, wherein said slide rail assembly is mounted for pivoting movement relative to said base assembly, said at least one slide rail being positionable generally parallel to a range of conical surface angles.

13. The mechanism of claim 12, wherein said base gear means comprises a base pinion gear and said slide carriage gear means comprises a slide carriage pinion gear.

14. The mechanism of claim 12, wherein said range of conical surface angles comprises angles above and below perpendicular to said base axis.

15. The mechanism of claim 14, wherein said angles below perpendicular to said base axis include angles up to 30° below perpendicular to said base axis.

16. The mechanism of claim 14, wherein said angles above perpendicular to said base axis include angles up to parallel to said base axis.

* * * * *